United States Patent [19]

Wolfrey et al.

[11] Patent Number: 4,632,859

[45] Date of Patent: Dec. 30, 1986

[54] REINFORCED SILICONE MODIFIED EPOXY TAPE BACKING

[75] Inventors: Austin A. Wolfrey, Boxford; Samuel C. Temin, Needham, both of Mass.

[73] Assignee: The Kendall Company, Boston, Mass.

[21] Appl. No.: 637,466

[22] Filed: Aug. 3, 1984

[51] Int. Cl.$^4$ .................. B32B 27/12; B32B 27/38; C09J 7/04

[52] U.S. Cl. ................... 428/288; 428/40; 428/290; 428/352; 428/354

[58] Field of Search ............ 428/352, 288, 290

[56] References Cited

U.S. PATENT DOCUMENTS 3,154,597  4/1964  Clarkson ................. 428/352

Primary Examiner—James C. Cannon
Attorney, Agent, or Firm—Alvin Isaacs

[57] ABSTRACT

A tape backing comprised of a siliconized epoxy resin reinforced with a polyester or polyamide non-woven fabric is described. The reinforcing non-wovens consist of polyester fibers or the more temperature resistant aromatic polyamide fibers. The non-woven reinforced silicone modified epoxy coated tape backing of the present invention has improved thermal, chemical, water, and electrical insulation resistance, and improved lubricity over the prior art backings. Additionally, an important advantage of the silicone modified composition of the present invention is that it is possible to eliminate release coating the backing when used as a tape backing, as the silicone increases the lubricity of the backing; i.e. the adhesion of the adhesive mass is lowered to the extent that no release coating or release liner is required during use.

13 Claims, No Drawings

REINFORCED SILICONE MODIFIED EPOXY TAPE BACKING

BACKGROUND OF THE INVENTION

The present invention relates to modified reinforced epoxy tape backings.

The present invention relates to silicone modified reinforced epoxy tape backings.

The present invention more particularly relates to a tape backing assembly comprising a silicone modified epoxy coated over a polyamide or polyester non-woven fabric material.

The present invention also relates to modified epoxy tape backings particularly useful for electrical tapes.

In applications where electrical tapes are required, the following are some of the important characteristics of such a tape: thermal stability, high dielectric strength, good electrical insulation properties, water resistance, and flame retardancy.

The conventional electrical tapes on the market with epoxy backings are designed for use at temperatures of up to about 130° C. The tape of the present invention is designed to perform satisfactorily at temperatures of up to about 160° C.

The tape of the present invention additionally exhibits dielectric strength values ranging from about 7.2 KV to about 8.7 KV. The conventional epoxy backed tapes, on the other hand, exhibit dielectric strength values in the range of from about 5.0 KV to about 6.5 KV.

The incorporation of silicone in the epoxy tape backing of the present invention results in the formation of an increased hydrophobicity of the film. This gives rise to a tape backing having improved water and chemical resistance characteristics.

Prior art embodiments have required that a release coating be applied to the tape during manufacture, in order to permit satisfactory unwinding of the tape during its use. Alternatively, the prior art embodiments may use a release liner in either the manufacture and/or use of the tape in order to permit satisfactory unwinding.

On the other hand, the tape backings of the present invention offer the important advantages of not requiring either a release coating or release liner in application.

It should be noted that the incorporation of the silicone in the epoxy resin results in enhanced chemical resistance as well as a decreased surface tension, which imparts the desired antiblocking characteristics to the tape backing of the present invention.

U.S. Pat. No. 3,154,597 describes polysiloxane modified epoxide resins. However, the '597 patent utilizes a reaction with a siloxy group, whereas the present invention utilizes a hydroxyl reaction with a carbinol group. The silicone reactant in the '597 patent is a product similar to Dow Corning's "Sylkyd 50" TM, which is essentially a methoxy terminated siloxane.

It should be noted that unlike other siliconized epoxy resins of the prior art, the present invention is based on the reaction of the epoxy resin with the organic portion of a siloxane copolymer. The reaction of the epoxy with carbinol proceeds more rapidly and with greater facility than reaction with a silanol group.

SUMMARY OF THE INVENTION

An object of the present invention is to provide a modified reinforced epoxy tape backing.

Another object of the present invention is to provide silicone-modified reinforced epoxy tape backings.

More particularly, another object of the present invention is to provide a modified reinforced epoxy tape backing comprising a silicone modified epoxy coated over a polyamide or polyester non-woven material.

An additional object of the present invention is to provide silicone modified epoxy reinforced tape backings that are useful for pressure sensitive electrical tapes, having improved electrical, thermal, and release properties.

In order to accomplish the above and other objectives, a silicone modified reinforced epoxy tape backing is described. The backing is comprised of an epoxy resin reacted with a siloxane polyoxy ethylene copolymer or similar polysiloxanes containing at least two organic carbinol groups coated over a polyamide or polyester non-woven material. The resulting silicone modified reinforced tape backing has improved dielectric strength characteristics, increased water resistance, improved lubricity and improved thermal and chemical resistance. The present invention has wide applications in the electrical tape market.

A tape backing comprised of a siliconized epoxy resin reinforced with a polyester or polyamide non-woven fabric is described. The reinforcing non-wovens consist of polyester fibers or the more temperature resistant aromatic polyamide non-wovens. The non-woven reinforced silicone modified epoxy coated non-woven tape backing of the present invention has improved thermal, chemical, and water resistance, and electrical insulation resistance, and improved lubricity than the prior art backings. Additionally, an important advantage of the silicone modified composition of the present invention is that it is possible to eliminate release coating the backing when used as a tape backing, as the silicone increases the lubricity of backing; i.e. the adhesion of the adhesive mass is lowered to the extent that no release coating or release liner is required during use.

DESCRIPTION OF THE PREFERRED EMBODIMENT OF THE PRESENT INVENTION

The present invention comprises an epoxy resin reacted with a polysiloxane-polyoxyethylene copolymer and reinforced with a polyamide or polyester non-woven fabric material.

The following is a convenient listing of the compounds mentioned in the specification, along with their trade name designations and respective chemical designations.

(a) 3,4 Epoxycyclohexylmethyl—3,4 epoxy cyclohexane carboxylate [Union Carbide—ERL-4221] and [CibaGeigy Araldite CY179]

(b) Bis (3,4 epoxycyclohexyl) Adipate [Union Carbide—ERL-4299]and [Ciba-Geigy Araldite CY178]

(c) 2 (3,4 epoxycyclohexyl - 5,5 spiro - 3,4 epoxy) cyclohexane - meta-dioxane [Union Carbide—ERL-4234]

(d) Bisphenol A/epichlorohydrin-based epoxy resin [Shell—Epon 828]

(e) Amine-hindered $BF_3$ complex [Pacific Anchor—Anchor 1222]

(f) Hydroxyl functional polydimethyl siloxane polyoxyethylene copolymer, with a molecular weight of approximately 2400 [i.e. a block copolymer comprising a polysiloxane mid block and poly (ethylene oxide) end blocks] [Dow Corning—Q4-3667]

(g) Poly (propylene oxide) triol [molecular weight of 5000] [Union Carbide—LHT-34]

(h) Poly (caprolactone) triol [molecular weight of 540] [Union Carbide—PCP-0300]

The epoxy resin can be either a cycloaliphatic or a glycidyl ether type. However, cycloaliphatics are preferred in the present invention. The silicone modifier employed here is an organo-functional silicone such as Dow Corning Q4-3667, a hydroxyl functional polydimethyl siloxane polyoxyethylene copolymer (m.w. 2,400).

Resin compositions having concentrations of Dow Corning Q4-3667 ranging from about 5 percent by weight to about 30 percent by weight have been utilized here. Correspondingly, the epoxy resin will vary in concentration from about 50 percent to about 95 percent by weight of the total composition. Frequently, it is desirable to incorporate a polyol, such as Union Carbide LHT-34, a poly (propylene oxide) triol, to enhance the flexibility of the cured composition. Varying epoxy resin concentrations will also result in compositions having desired end use application properties.

Additionally, Union Carbide ERL4299, a linear difunctional cycloaliphatic epoxide made from adipic acid, imparts improved flexibility in the tape backing. Union Carbide ERL4234, a heterocyclic difunctional epoxy resin, imparts a higher modulus characteristic to the resulting tape backing. Additionally, diglycidyl ethers of bisphenol A, such as Shell EPON 828, impart increased stiffness to the tape backing.

Further, the tape backing of the present invention can be made flame retardant by incorporating from about 13 percent by weight bromine (decabromodiphenyloxide, or the like), and from about 3 percent to about 5 percent by weight antimony (e.g. antimony trioxide). The above tape backing embodiments were also found to pass the UL510 flame retardancy test.

A preferred typical exemplary embodiment of the present invention comprises about 30 percent by weight of Union Carbide ERL4299, about 40 percent by weight of Union Carbide ERL4234, about 25 percent by weight of Dow Corning Q4-3667, and about 5 percent by weight of a catalytic curing agent, such as Pacific Anchor- Anchor 1222, i.e. a salt of $BF_3$ and an amine.

Particularly preferred embodiments of the present invention include polyether diols and triols, such as Union Carbide LHT-34, a poly(propylene oxide) triol, resulting in an enhanced flexibility of the tape backing material.

The chemical reaction of a preferred embodiment, i.e. Dow Corning Q4-3667, which is a linear hydroxyl-terminated polydimethyl siloxane polyoxyethylene copolymer, and the epoxy resin, take place through the terminal hydroxyl groups of the Dow Corning Q4-3667, and the oxirane groups of the epoxy resins. A secondary reaction also takes place between the secondary hydroxyl group formed from the ring opening of the oxirane. Best results have been observed using $BF_3$-amine complexes and polyarylonium salts. Formulations made with cycloaliphatic epoxy resin yielded the lowest viscosity and fastest curing solutions, thus facilitating the coating process. These systems also were found to wet the non-woven more readily than formulations based solely on glycidyl ether type epoxies.

The liquid resin components of the exemplary embodiments of the present invention are physically stirred together at room temperature until a homogenous mixture is obtained. The resulting resin mixture compositions have a shelf life of about six months in the liquid form before polymerizing. On the other hand, systems curable at room temperature and having short pot lifes may be formulated using more active catalysts.

An exemplary method of preparing the tape backing material of the present invention is now described.

A non-woven web material, comprising polyester or aromatic polyamide fibers, is passed through a liquid bath of an exemplary formulation, as described above. Two Meyer rods in apposition result in a metered application of the liquid bath to the non-woven substrate material. Alternatively, other conventional coating methods, such as roll coating, etc., may be used if so desired in particular applications.

Variable coating thicknesses are readily obtained in the present invention, according to the desired end use applications. Coating thicknesses of from about 4.0 mils to about 6.0 mils are especially desirable, and have been readily achieved in embodiments of the present invention.

To affect cure of the modified epoxy resin, cure cycles will range from typical dwell times of from about 2.5 minutes to about 10 minutes, and temperatures of from about 300° F. of to about 400° F.

The amount of a liquid coating material that we have applied to the non-woven has varied from about 60 grams per square yard to about 125 grams per square yard.

Numerous other nonwoven backings are envisioned as being utilizable with the present invention. One exemplary embodiment utilizes DuPont Spun Laced Nomex TM nonwoven, i.e. an aromatic polyamide fiber assembly.

The present invention is further exemplified below by several examples thereof in accordance with the preferred embodiments of the invention. However, it is understood that the invention is not limited to the examples included, but that equivalents will be apparent to those skilled in the art, and disclosed herein.

EXAMPLES

Example 1

Preparation of Silicone Modified Epoxy Coatings

The five silicone modified epoxy compositions shown in the Table I below, i.e. formulations, 1,2,3,4,5, and 6, were prepared with from 15 to 30 percent Dow Corning Q4-3667 silicone copolymer resin. Dow Corning Q4-3667 comprises approximately 20 percent silicone by weight. Consequently, the actual level of silicone incorporation is from 3 to 6 percent.

The components of each formulation were added under shear via a laboratory mixer at about 200 rpm at room temperature. The solutions were mixed for 5 minutes and then allowed to set for 24 hours for de-gassing. The coatings were then applied to Dupont's spun laced Nomex TM non-woven with a double steel roll coater gapped at 5.0 mils. The samples were then cured for 3 minutes at 330° F. The formulations and test results are shown in Table I.

TABLE I

|              | 1        | 2        | 3        | 4        | 5        | 6    |
|--------------|----------|----------|----------|----------|----------|------|
| ERL-4221     | 30       | 30       | 20       | 20       | 10       | —    |
| ERL-4299     | —        | —        | —        | —        | 25       | —    |
| ERL-4234     | 40       | 30       | 20       | 20       | 40       | —    |
| Epon 828     | —        | 10       | 30       | 25       | —        | 70   |
| Q4-3667      | 25       | 25       | 25       | 30       | 15       | 20   |
| Anchor 1222  | 5        | 5        | 5        | 5        | 10       | 10   |
| Pencil Hardness | 2H    | H        | H        | H        | H        | F-H  |
| *MEK rubs (double) | 50 | 50       | 50       | 50       | 100      | 30   |
| **Lubricity  | VG       | VG       | VG       | VG       | VG       | G    |
| Thickness (mils) | 5.2  | 4.9      | 5.3      | 4.7      | 4.7      | 4.7  |
| Pot life @ RT | 30 days+ | 30 days+ | 30 days+ | 30 days+ | 30 days+ | —  |
| Dielectric Strength (KV) | 9.7 | 7.8 | 8.6 | 7.2 | 9.4 | 8.5 |

*MEK rubs were done by saturating a cotton gauze and rubbing the cured film with moderate pressure.
**Lubricity was evaluated by feel. All coatings have an extremely lubricious feel.

Example 2

Thermal Stability

The following thermal stability test was performed on samples of formulations A and B (see below) that were coated and then cured over a polyester non-woven, i.e. Pellon 7605A. The non-wovens were saturated using a laboratory parallel bar coater at a gap setting of 5.0 mils. Samples were then cured vertically for 3 minutes at 330° F. A 1" by 7" sample was then cut from each cured film. The samples were hung and secured on a rack. A 1 kg weight was attached to the bottom of each vertically hanging sample. The samples were then placed into a preheated oven at 200° F. After the samples were put into the oven, the temperature was increased. The time in oven and oven temperature at the time of breaking of the sample was recorded for each of the samples (see below).

|             | A    | B (no silicone) |
|-------------|------|-----------------|
| ERL-4299    | 50.0 | 50.0            |
| Q4-3667     | 10.0 | —               |
| LHT-34      | 10.0 | 20.0            |
| Anchor 1222 | 6.0  | 6.0             |
| Total Parts | 76.0 | 76.0            |

| RESULTS | | |
|---------|---|---|
| Sample | Time to Failure (min) | Oven Temp. (°F.) |
| A on Pellon 7605A | 58 mins. | 484° F. |
| B on Pellon 7605A | 40 mins. | 261° F. |

Note:
Formulation B, which had no silicone added, clearly shows a lack of thermal stability

Example 3

Surface Tension

The surface tension of these samples were also measured with a Pillor Corporation Surface Tension Kit, with the results shown below.

Results

Surface Tension

A 30 dynes/cm$^2$
B 34 dynes/cm$^2$

The non silicone-containing epoxy formulation, i.e. B, exhibited a tape backing with a surface tension of 34 dynes/cm$^2$ whereas the siliconized backing gave a surface of dynes/cm$^2$.

Example 4

Water Resistance Test

Samples of polyester material, i.e. Pellon 7605A, that were coated with formulas A and B (see Example 2 above), were submerged in boiling water for 90 minutes. The sample coated with formulation A did not whiten, whereas the sample coated with formulation B showed evidence of whitening.

Example 5

Samples of formulas 1-3 in Table II below were coated on polyester material, i.e. Pellon 7605A.

TABLE II

|             | 1  | 2  | 3  |
|-------------|----|----|----|
| ERL-4221    | 30 | 30 | 30 |
| ERL-4299    | 35 | 35 | 35 |
| LHT-34      | 10 | 5  | 7  |
| PCP-0300    | 10 | 10 | 10 |
| Q4-3667     | 10 | 15 | 12 |
| Anchor 1222 | 5  | 5  | 5  |

The above compositions when coated and cured on Nomex or polyester nonwoven, all exhibited good release properties, i.e. no coating or liners were required. All had dielectric strengths in exces of 7.4 KV, as well as excellent flexibiilty as a tape backing.

What is claimed is:

1. A tape backing material useful for a pressure sensitive tape comprising:
    a non-woven fabric material; and
    a siliconized epoxy resin coated onto said fabric material, said siliconized epoxy resin being the reaction product of an epoxy resin with the organic portion of a polysiloxane containing at least two carbinol groups.

2. A tape backing material useful for a pressure sensitive tape comprising:
    a non-woven fabric material; and
    a siliconized epoxy resin coated onto said fabric material, said siliconized epoxy resin being the reaction product of an epoxy resin with the organic portion of a polysiloxane containing at least two carbinol groups;
    said coating comprising, from about 25 percent to about 35 percent by weight of bis (3,4, epoxy cyclohexyl) adipate;
    from about 25 percent to about 35 percent by weight of 3,4 epoxycyclohexylmethyl - 3,4 epoxycyclohexane carboxylate;
    from about 5 percent to about 15 percent by weight of poly(propylene oxide) triol;

from about 5 percent to about 15 percent by weight of poly(caprolactone) triol;

from about 5 percent to about 15 percent by weight of hydroxyl functional polydimethyl siloxane poly(oxyethylene) copolymer; and from about 3 percent to about 8 percent by weight of an amine-hindered BF$_3$ complex.

3. The tape backing material as described in claim 1 or 2, wherein said non-woven fabric material comprises a material selected from the group consisting of polyamide and polyester fibers.

4. The tape backing material as described in claim 1 or 2, wherein said non-woven fabric material is comprised of aromatic polyamide fibers.

5. The tape backing material as described in claim 1 or 2, wherein said siliconized epoxy resin comprises from about 3 percent to about 6 percent of silicone.

6. The tape backing material as described in claim 1 or 2, wherein said polysiloxane comprises copolymers containing a polysiloxane component and an organic component incorporating hydroxyl groups.

7. The tape backing material as described in claim 1 or 2, wherein said polysiloxane comprises a block copolymer incorporating a polysiloxane midblock and poly(ehtylene oxide) end blocks.

8. The tape backing material as defined in claim 1 or 2, wherein said epoxy resin is cycloaliphatic.

9. The tape backing material as defined in claims 1 or 2 wherein said coating comprises a mixture of siliconized cycloaliphatic epoxy resins, each said siliconized resin being the reaction product of an epoxy resin with the organic portion of a polysiloxane containing at least two carbinol groups.

10. The tape backing material as defined in claim 8 wherein said coating further contains a flexibilizing hydroxy-terminated polyether or polyester.

11. The tape backing material as described in claim 1 or 2, wherein said polysiloxane comprises from about 5 to about 30 by weight of the total epoxy resin composition.

12. The tape backing material as described in claim 1 or 2, wherein said coating further includes a flame retardant.

13. The tape backing material as described in claim 12 wherein said flame retardant comprises a mixture of a bromine-containing compound providing about 13 percent by weight of bromine; and an antimony-containing compound providing from about 3 percent to about 5 percent by weight of antimoney.

* * * * *